(12) United States Patent
Newman (10) Patent No.: US 8,459,445 B2
(45) Date of Patent: Jun. 11, 2013

(54) COLORED CONTACT LENS PRIMARY PACKAGING

(75) Inventor: Stephen D. Newman, Bayshore Park (SG)

(73) Assignee: Menicon, Co., Ltd., Singapore (SG)

( * ) Notice: Subject to any disclaimer, the term of this patent is extended or adjusted under 35 U.S.C. 154(b) by 0 days.

(21) Appl. No.: 11/780,987

(22) Filed: Jul. 20, 2007

(65) Prior Publication Data

US 2008/0017525 A1 Jan. 24, 2008

Related U.S. Application Data

(60) Provisional application No. 60/832,324, filed on Jul. 21, 2006, provisional application No. 60/833,230, filed on Jul. 24, 2006.

(51) Int. Cl.
*A45C 11/04* (2006.01)
*B65B 7/28* (2006.01)

(52) U.S. Cl.
USPC ................................ 206/5.1; 53/471; 53/478

(58) Field of Classification Search
USPC .. 206/5.1, 438; 134/901; 422/28, 30; 53/471, 53/477, 478
See application file for complete search history.

(56) References Cited

U.S. PATENT DOCUMENTS

| | | | |
|---|---|---|---|
| 4,392,569 A | 7/1983 | Shoup | |
| 4,691,820 A | 9/1987 | Martinez | |
| 5,320,843 A * | 6/1994 | Raheja et al. | 206/5.1 |
| 5,340,583 A * | 8/1994 | Dziabo et al. | 424/412 |
| 5,362,444 A * | 11/1994 | Amtower | 422/30 |
| 5,443,987 A * | 8/1995 | DeCicco et al. | 435/4 |
| 5,515,117 A * | 5/1996 | Dziabo et al. | 351/160 H |
| 5,531,963 A * | 7/1996 | Powell, Jr. | 422/30 |
| 5,573,108 A * | 11/1996 | Hamilton et al. | 206/5.1 |
| 5,620,088 A | 4/1997 | Martin et al. | |
| 5,704,468 A | 1/1998 | Lust et al. | |
| 5,823,327 A | 10/1998 | Wu et al. | |
| 5,853,085 A | 12/1998 | Luttrell | |
| 7,086,526 B2 * | 8/2006 | Newman | 206/5.1 |
| 7,374,037 B2 * | 5/2008 | Lipscomb et al. | 206/5.1 |
| 7,967,133 B2 * | 6/2011 | Newman | 206/5.1 |
| 2005/0056553 A1 * | 3/2005 | Matsuzawa et al. | 206/5.1 |
| 2005/0205451 A1 | 9/2005 | Brown-Skrobot et al. | |

FOREIGN PATENT DOCUMENTS

| | | |
|---|---|---|
| EP | 0 129 388 | 12/1984 |
| EP | 0 686 563 B1 | 12/1999 |
| EP | 1 092 645 | 10/2004 |
| EP | 1 470 906 A | 10/2004 |
| EP | 1 757 532 A | 2/2007 |
| FR | 2 875 488 A | 3/2006 |
| WO | WO 94/06612 A | 3/1994 |
| WO | WO 2004/024573 A | 3/2004 |
| WO | WO 2005/092709 A | 6/2005 |

* cited by examiner

*Primary Examiner* — Bryon Gehman
(74) *Attorney, Agent, or Firm* — Holland & Hart, LLP (57) ABSTRACT

A contact lens package includes a substrate, wherein the substrate includes a color component configured to provide a contamination detecting contrast to the substrate. Additionally, the color component provides a psychological message of cleanliness so as to reinforce compliance with good hygiene practices, or to provide a unique selling point for the finished product.

23 Claims, 6 Drawing Sheets

COLORED CONTACT LENS PRIMARY PACKAGING

RELATED APPLICATION

The present application claims the benefit under 35 U.S.C. §119(e) of U.S. Provisional Patent Application No. 60/832,324 filed Jul. 21, 2006 titled "DUO PACKAGING FOR DISPOSABLE SOFT CONTACT LENSES USING A SUBSTRATE", and also claims the benefit of U.S. Provisional Patent Application No. 60/833,230 filed Jul. 24, 2006 titled "COLORED CONTACT LENS PRIMARY PACKAGING". All of these applications are hereby incorporated by reference in their respective entireties.

FIELD

The present systems and methods relate to contact lens packaging and more particularly, to an improved system and method for forming a colored contact lens primary package while satisfying lens packaging criteria, including sterility.

BACKGROUND

Soft disposable contact lenses are commonly contained in disposable packages. As packaging adds to the overall cost of the lens, it should be made as economically as possible but without compromise to the requisite packaging criteria. The traditional blister pack packaging (shown in FIGS. 1-3) for disposable lenses (both bi-weekly and daily) consists of a polypropylene receptacle for the lens (herein after referred to as a "boat"), topped by a multi-layer film consisting of polyethylene, aluminum, a bonding agent and polypropylene. The boat is typically an injection molded plastic which has high stiffness but is capable of limited elastic deflection and includes a preformed recess. The boat is filled with a suitable storage solution, preferably saline, and receives a single lens in situ. The blister pack is then autoclaved using steam and pressure to terminal sterility. These blister packs are presented to the patient in boxes of individual packs (FIGS. 4-5) or as multiple blister strips.

The marketing objective is to present the contact lens to a patient in an aesthetically pleasing package that both satisfies the statutory requirements for sterility and stability, and allows the patient to remove the lens safely and easily. The lens must be kept hydrated while in the package. The package must be well sealed and should minimize water vapor transmission through the boat and laminated layer to maximize the shelf life and prevent drying out of the lens contained therein. During use, the user removes the laminated material from a flange formed on the boat by peeling back the cover to expose the lens immersed in a hydrating solution.

A variety of contact lens packages, particularly disposable contact lens packages including preformed blister packs, have been traditionally used. Conventional wisdom in the contact lens industry has been to provide preformed stiff packaging which protects the lens from damage from applied load. Examples of traditional blister packs are shown in: U.S. Pat. Nos. 5,704,468; 4,392,569; 5,620,088; 5,691,820; 5,823,327; 5,853,085; EP Publication No. 1 092 645; and EP Publication No. 0 129 388.

While numerous contact lens packages exist, they all traditionally include boats made of homopolymer polypropylene in order to satisfy statutory requirements for sterility. While sterility is provided by the use of homopolymer polypropylene, the resulting product is a semi-transparent boat or substrate unable to provide secondary utility.

SUMMARY

The present specification provides an economical package without compromise to statutory and medical requirements of contact lens packages.

The single-use package, in the embodiments described below, offers a number of advantages over the prior art blister pack concept. First, the single-use package includes a colorant component configured to allow for the rapid identification and inspection of a lens contained within the package. In addition to the identification of the lens, the colorant component is configured to either aid a patient in identifying contamination or other foreign objects in the lens package, or to enhance the cosmetic appeal of the package, for instance to either provide psychological message of cleanliness so as to reinforce compliance with good hygiene practices, or to provide a unique selling point for the finished product.

Further, according to one exemplary embodiment, the present single-use package including a colorant component may include other additives providing a secondary utility such as increased sterility or UV protection.

According to one exemplary embodiment, a primary contact lens package includes a substrate, wherein the substrate includes a homopolymer and a polymer masterbatch component.

According to one exemplary embodiment, the masterbatch component comprises between approximately 0.5 and 10.0% of the substrate material.

In an additional exemplary embodiment, a method of forming a substrate member of a single use contact lens primary package includes forming a first portion of the substrate member with a first colored shot of a two shot mold and forming a second portion of the substrate member with a second shot of the two shot mold, wherein the second shot only injects homopolymer polypropylene over portions of the substrate member that will be exposed to a contact lens stored therein.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

A package for contact lenses and a method for manufacturing the contact lens packaging are described herein. More specifically, a package with a substrate is disclosed, wherein the substrate, whether a boat or a planar substrate, includes a color component to aid a patient in locating a contact lens and identifying contaminants that may be present in the package. According to one exemplary embodiment, the color component is provided to the substrate by the addition of a masterbatch additive to a homopolymer. Alternatively, according to one exemplary embodiment, the color component is provided to the substrate by performing a two-shot mold operation. Further details of the present exemplary substrates and their methods of formation will be provided in detail below.

As used in the present specification and in the appended claims, the term "barrier material" refers generally to any material which may come into physical and fluid contact with a contact lens. Although polypropylene is commonly used as a barrier material in contact lens packages, any other material that is capable of creating a barrier environment for contact lenses can be used in the present article and method as well. According to one exemplary embodiment, a barrier material may include any material accepted by the Food and Drug Administration (FDA) as suitable for the packaging of sterile medical devices.

In the following description, for purposes of explanation, numerous specific details are set forth in order to provide a thorough understanding of the present packaging and method for manufacturing the packaging. It will be apparent, however, to one skilled in the art that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

In the accompanying drawings, some elements are not drawn to scale, in order to better illustrate the relationship between components.

Figures 1, 3:
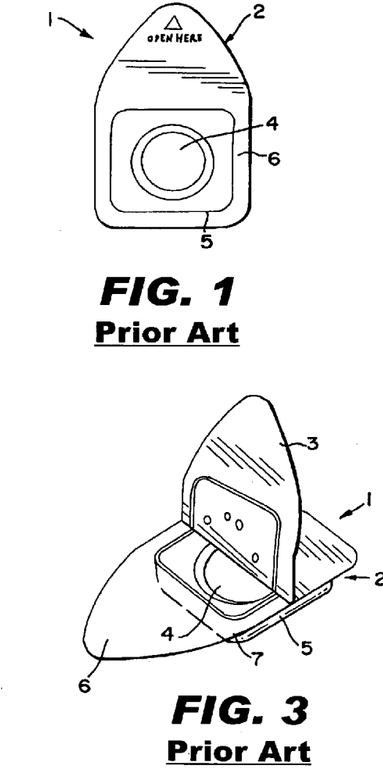
FIG. 1 is a plan view of a typical prior art disposable blister contact les package.
FIG. 3 is a perspective view of the partially opened package of FIG. 2.
Figure 2:
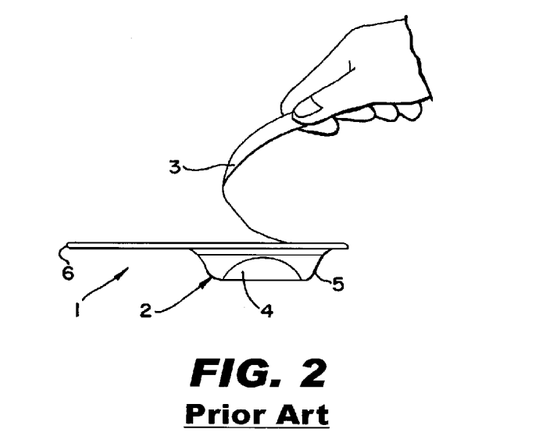
FIG. 2 is a side elevation of the package of FIG. with the lid peeled away to release the contact lens therein.

Referring to FIGS. 1 and 2, there is shown a typical prior art disposable blister contact lens package (1) which is formed in two parts. The package (1) comprises a blister pack member (2) which is sealed by a membrane (3) forming a lid on the package (1) and which may be peeled away to release a contact lens (4) therein.

In FIG. 3, the package of FIG. 2 is shown with the membrane (3) peeled away to expose the contact lens (4). Typically, the member (2) will be a preformed blister pack and include a profiled recess (5) which provides a recess in which a lens may be placed. The member (2) is typically injection molded from homopolymer polypropylene and the package is completed with a sealing membrane (3) which mates with a flange (6) to create a sterile seal. The contact lens (4) is immersed in a solution (7) which keeps the lens hydrated until it is removed from the pack. As mentioned previously, the traditional method of forming blister packs using homopolymer polypropylene is effective in producing blister pack members (2) that are approved for providing the required sterility, however, the resulting color of the blister pack member (2) is a semi-transparent grey color.

Figure 4:
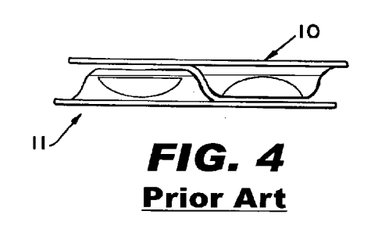
FIG. 4 is a side elevation view showing a stacking arrangement for two identical prior art contact lens package according to one embodiment.
Figure 5:
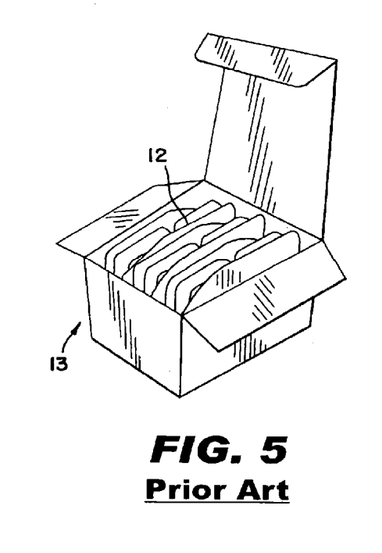
FIG. 5 is a perspective view showing a plurality of blister packs stacked as in FIG. 4 and contained in a carton.

FIG. 4 shows a stacking arrangement for two identical prior art contact lens packages (10 and 11). It can be seen from FIG. 4 that although two packs conveniently inter-fit, they take up a thickness greater than the thickness (or depth) of one pack. Ideally, a lens package should take up as little space as possible considering the relatively small size of a contact lens.

In recent news, several outbreaks of such eye infecting bacteria such as *Fusarium keratitis* has emphasized the need for sterile primary contact lens packaging and the ability to view and identify any foreign objects that may be present in the contact lens packaging. In some rare instances, contamination may originally be present in the primary contact lens packaging. However, a large portion of contaminants that make their way to a primary contact lens packaging originate from a finger of a patient attempting to retrieve and insert the contact lens.

According to one exemplary embodiment of the present exemplary system and method, a color component is added to the blister pack member (2). The addition of the color component allows a patient or other user to readily identify any contamination or foreign object that may be present in the blister pack member. Additionally, according to one exemplary embodiment, the present blister pack member (2) continues to provide the statutorily mandated levels of sterility.

According to one exemplary embodiment, the color component of the blister pack member (2) that provides the contaminant identifying contrast includes, but is in no way limited to, a masterbatch component. According to this exemplary embodiment, the masterbatch component includes a carrier; typically the carrier is the same polymer to be used in the final molding, but with a higher melt flow index. According to this exemplary embodiment the carrier is configured to be compatible with the final polymerized article.

According to the present exemplary embodiment, the masterbatch component is essentially a color concentrate configured to impart a desired color to a polyolefin or polypropylene resin. In the present exemplary embodiment, the masterbatch may be blended with a resin using a loading of between approximately 0.5% and 10% homopolymer. Once the masterbatch is blended with the homopolymer resin, a colored plastic part can be produced by conventional molding.

Any number of colors may be provided using the masterbatch color component. Commercially available masterbatch materials may be provided by any number of suppliers including, but in no way limited to, Ampacet and Clariant. In addition to providing a broad pallet of colors via a masterbatch component, many masterbatch providers also offer color matching services in order to match the color of the present blister pack member (2) with a secondary packaging member or with other blister pack members (2).

While any number of masterbatch color components may be used to provide a contaminant contrasting color to the blister pack members, according to one exemplary embodiment, the masterbatch color components include an FDA approved colorant for food, drugs, medical devices and cosmetics. Particularly, according to one exemplary embodiment, the masterbatch color component corresponds to an approved colorant listed in 21 CFR 73 and 21 CFR 74.

According to one exemplary embodiment, for purposes of example only, the masterbatch color component may include, but is in no way limited to, commercially available 110194-K White 60 polypropylene masterbatch configured to generate a white blister pack member (2). According to this exemplary embodiment, the 110194-K White 60 polypropylene masterbatch includes ingredients that are regulated as acceptable as indirect food additives under paragraphs 174.5, 177.1520 (c) 3.2a and 178.3297 of Title 21 of the Code of Federal Regulations. According to one exemplary embodiment, the white polypropylene masterbatch includes titanium di-oxide configured to impart a white color to the base polymer.

While the present example is described in the context of forming a white polypropylene blister pack member, any number of colors may be used including, but in no way limited to, white, grey, yellow, green, blue, red, purple, orange, brown, pink, black, gold, silver, and the like. Additionally, while the present example is described in the context of forming a white polypropylene blister pack member, any polymer substrate used in a primary contact lens case may receive a color component from the addition of a masterbatch component.

In addition to providing a contrasting color for the rapid identification of contaminants, the formation of a blister pack member (2) including a masterbatch component may be used to aid a patient in readily identifying the contact lens contained in the blister pack member. For example, the color combination of the blister pack member (2) and the color of the in-monomer tint included in the contact lens may produce a known color effect. For example, according to one exemplary embodiment, a yellow substrate may be formed using a masterbatch approach, as mentioned above, and used in combination with a contact lens having a blue in-monomer tint. The result will be an optically visible green dot where the yellow of the substrate combines with the blue in-monomer tint, thereby allowing the patient to readily identify the contact lens. Additionally, any other color that is viewed by the patient will indicate a contaminant.

While the addition of the masterbatch component to the substrate forming polymer is described for purposes of adding color to the substrate, additional beneficial effects may be performed by the masterbatch component including, but in no way limited to, providing a perfume or a biocide to the substrate. According to one exemplary embodiment, the masterbatch component may add a perfume component to the substrate. When a patient opens a primary contact lens case containing the perfumed component, a perfume sensation would be experienced. While any number of scents may be employed, according to one exemplary embodiment the scent includes an antiseptic or other scent configured to create a feeling of sterility for the patient. According to one exemplary embodiment, the antiseptic scent heightens the patient's care to avoid contamination.

Other benefits may include protecting the primary contact lens package against the effects of ultra-violet (UV) radiation. Traditional blister packs will allow UV to impinge on the lens, which could degrade the polymer on continued exposure. However, the use of a masterbatch component, such as titanium dioxide, would render the polypropylene substrate UV opaque.

Alternatively, the masterbatch component may be configured to release a biocide into the solution contained by the primary contact lens package. Particularly, according to one exemplary embodiment, more and more plastic household items are now available that are biocidal in nature. According to one exemplary embodiment the biocidal element of the masterbatch component may include, but is in no way limited to, silver ions, triclosan, and/or trichlorocarban. According to this exemplary embodiment, placing a leaching silver layer into the primary lens package would reduce bacterial contamination of the lens from handling during insertion According to yet another exemplary embodiment, the masterbatch component may also be configured to release adjuncts for the saline. Particularly, according to one exemplary embodiment, adjuncts such as hyaluronic acid (HA) or dexpanthenol may be configured to be released from the primary case substrate. According to this exemplary embodiment, the release of the adjunct may temporally diminish. However, heating the pack, such as during an autoclaving operation, may assist in release of the adjunct.

While the above-mentioned examples are described in the context of a traditional blister pack (2), any number of contact lens packages may also incorporate the above-mentioned masterbatch components.

Figure 6:
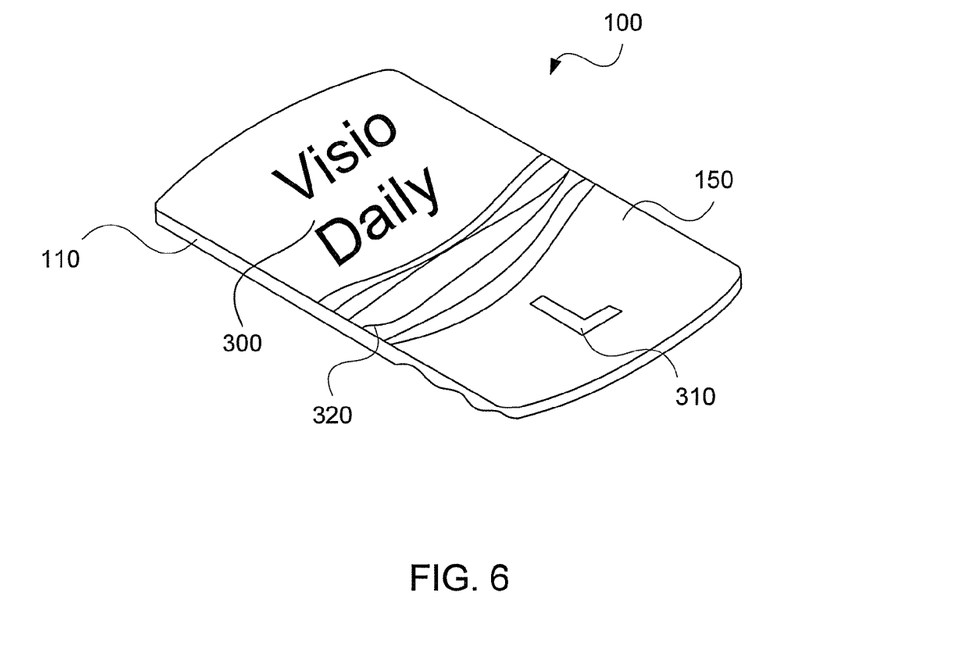
FIG. 6 is a top perspective view of a contact lens package, according to one exemplary embodiment.

FIG. 6 is a top perspective view of a contact lens package, according to one alternative embodiment. As illustrated in FIG. 6, the present exemplary contact lens package (100) includes a center substrate (110) including a top sheet member (150) coupled to the top surface of the substrate. According to one exemplary embodiment, the top sheet member (150) is coupled to the top surface of the substrate (110) by an EZ-peel connection such that the top sheet member (150) can be separated from the substrate (110) with a constant and relatively low pulling force. Additionally, as will be described in further detail below, the top sheet member (150) is coupled to the top surface of the substrate (110) sufficient to allow the exemplary contact lens package (100) to be autoclaved. Additionally, FIG. 6 shows that the top sheet member (150) may contain various words and/or images including, but in no way limited to a brand name (300), a design (320), and/or information about the contact (310), for example, that it is for the left or right eye, and instructions for use.

Figure 7:
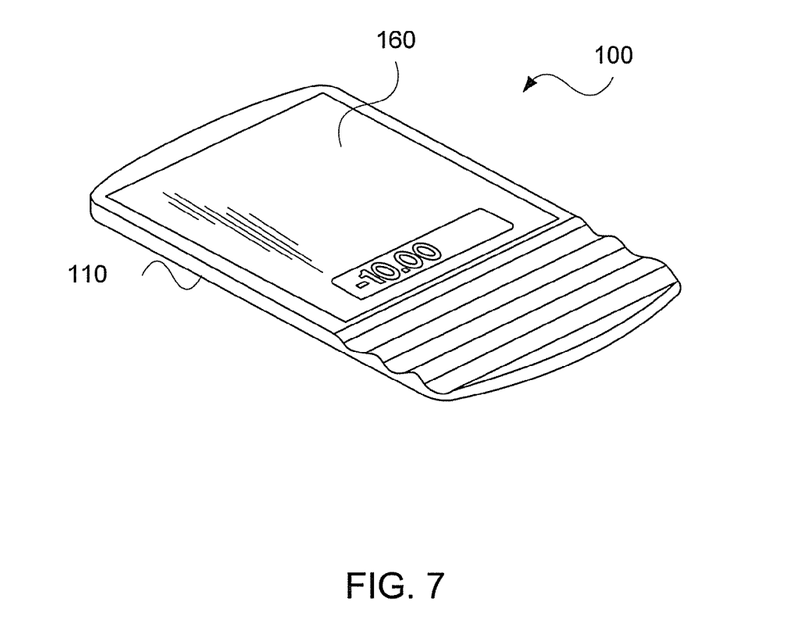
FIG. 7 is a bottom perspective view of a contact lens package, according to one exemplary embodiment.

Similarly, FIG. 7 is a bottom perspective view of the present exemplary contact lens package (100), according to one exemplary embodiment. As illustrated, a bottom sheet member (160) is coupled to the bottom surface of the substrate (110), opposite the top sheet member (150). As shown, the bottom sheet member (160) may be permanently or securely coupled to the bottom surface of the substrate (110) without a non-coupled portion or other member for removal of the bottom sheet member (160) from the substrate. FIG. 7 also illustrates a handle end (220) or gripping surface formed on the bottom surface of the substrate (110).

According to one exemplary embodiment, the exemplary top sheet (150) and the exemplary bottom sheet (160) may include a laminate foil. The laminate foil may include, but is in no way limited to, a bottom or innermost layer comprising a homogeneous material such as polypropylene to ensure the sterility of the lens (220), which covers at least the region of the foil that may be in physical or fluid contact with the lens. Above the inner layer may be, according to one exemplary embodiment, a layer of metal foil such as aluminum that provides strength and flexibility. Above the aluminum layer, a top layer may be formed including a polymer, such as, but not limited to polyethylene, polyester or polyamide The exemplary bottom sheet (160) may also include a laminate foil according to one exemplary embodiment. As mentioned above, the top or innermost layer of the bottom sheet (160) which is in physical or fluid contact with the lens (200) includes a barrier material. The bottom sheet (160) is otherwise designed to maintain the integrity of the packaging during handling, and may comprise the same layers as the top sheet (150), as mentioned above. The bottom sheet (160) does not need to be separated from the substrate and thus may be permanently attached to the substrate (110), such as through a high temperature heat seal or other substantially permanent coupling. In an exemplary embodiment, the laminate foil is shorter in length than the substrate so that the bottom sheet covers and is attached to body end of the substrate, but not to the handle portion. Words and images may also be printed on the bottom foil.

Figure 8:
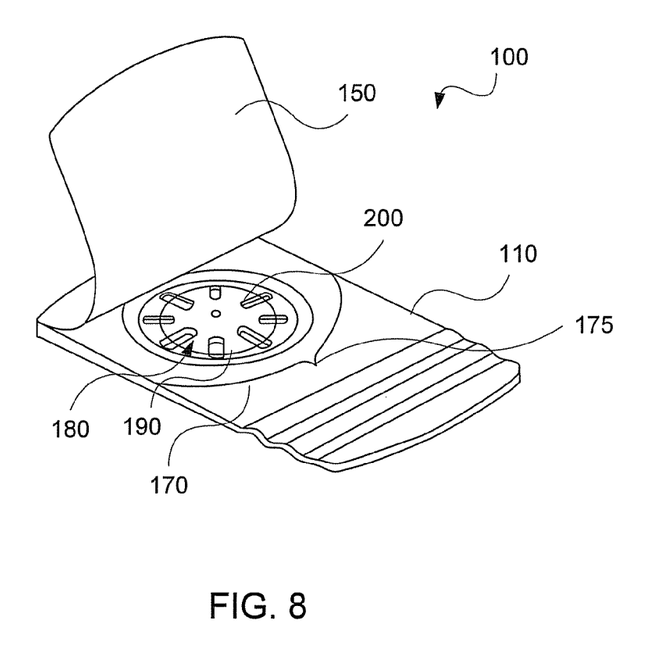
FIG. 8 is a top perspective view of a partially opened contact lens package, according to one exemplary embodiment.

FIG. 8 illustrates an exemplary contact lens packaging system (100) including a spring disc (190) disposed in the orifice (180). According to one exemplary embodiment, the spring disc (190) may be positioned in the orifice (180) as an integrated portion of the substrate (110). Alternatively, the spring disc (190) may be an independent member disposed in the orifice (180) without coupling structure, thereby allowing the spring disc (190) to float within the orifice.

Figure 9:
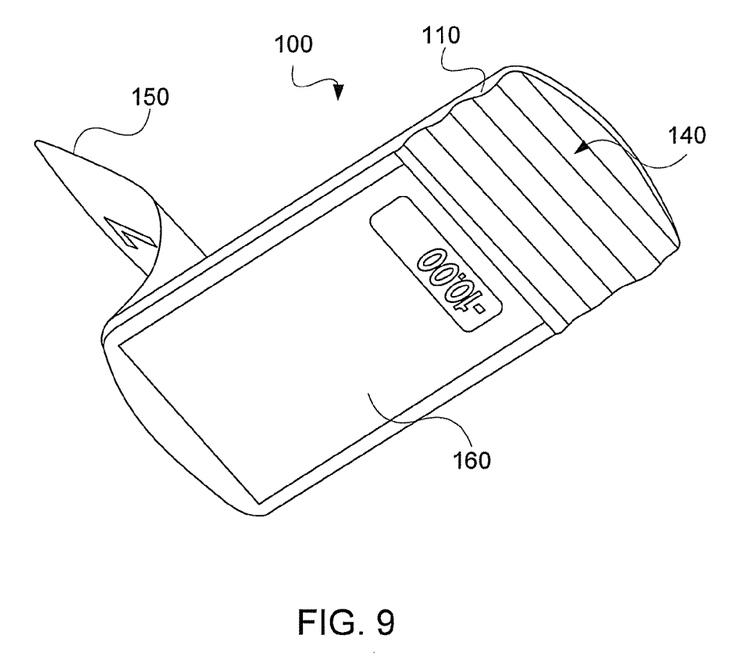
FIG. 9 is a bottom perspective view of a partially opened contact lens package, according to one exemplary embodiment.

As shown by the bottom perspective view of FIG. 9, the bottom sheet member (160) is not removed during removal of a contact lens (200) from the present contact lens packaging system. Rather, according to one exemplary embodiment, the bottom sheet member (160) is securely adhered to the bottom surface of the substrate (110) without access tabs or any other material that allows for the removal of the sheet member. Also illustrated in FIG. 9, the ridged grip area (140) aids in the removal of the top sheet member (150).

Figure 10:
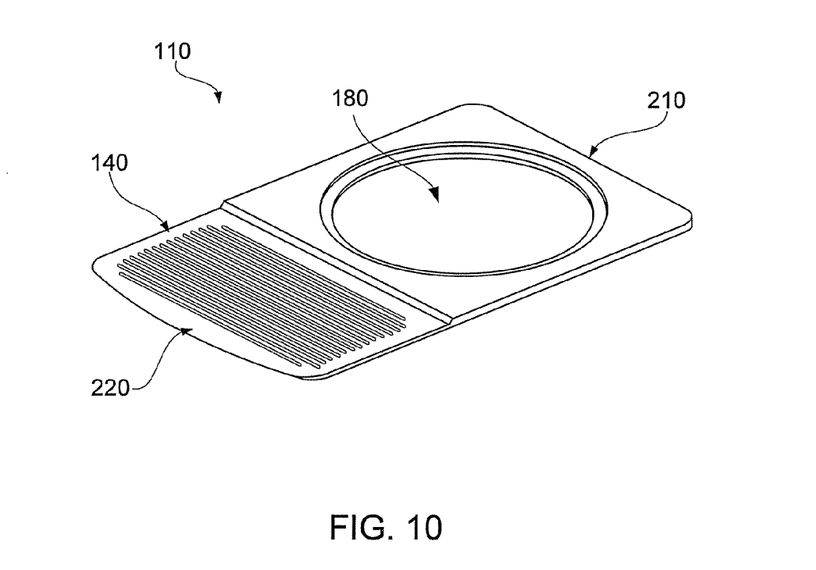
FIG. 10 is a top perspective view of a center substrate of a contact lens package, according to one exemplary embodiment.

FIG. 10 is a perspective view of the substrate, according to one exemplary embodiment. As illustrated in FIG. 10, the substrate (110) defines an orifice (180) sized to receive the contact lens (200) and other packing elements. For example, according to one exemplary embodiment, a shape restoration element (190), such as a spring disc or a sponge may be present below the lens (200).

Figure 11:
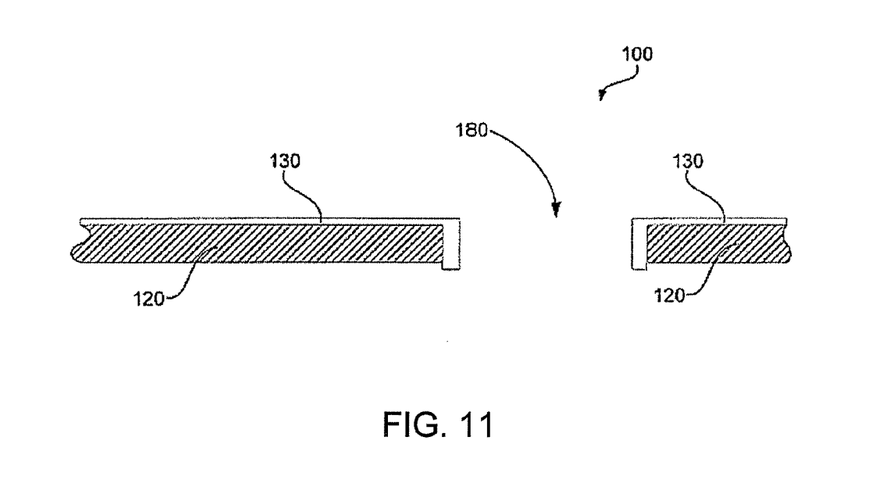
FIG. 11 is a side cross-sectional view of a substrate for use in a contact lens primary package formed by a two-shot mold, according to one exemplary embodiment.

According to one exemplary embodiment illustrated in the cross-sectional view of FIG. 11, the substrate (110) may be formed from a plurality of materials including a barrier region having a barrier material coating (130) that may be exposed to the lens (200). This barrier region having a barrier material coating (130) may include, according to one exemplary embodiment, a homogeneous material such as natural or homopolymer polypropylene to ensure the sterility of the lens. Alternatively, the barrier region having a barrier material coating (130) may be formed of any number of FDA approved barrier materials. According to one exemplary embodiment, the barrier region having a barrier material coating (130) is sufficiently thick to provide the desired level of sterility, while simultaneously being sufficiently thin to be at least partially transparent. According to this exemplary embodiment, the remaining portion of the substrate (110) is composed of a bulk of core material (120). The core material (120) can comprise essentially any material, as the core material (120) does not contact and is in no way exposed to the lens (200), thereby providing the ability to include any number of colors, surface finishes, stiffness, and other desired material properties.

According to the present exemplary configuration, the core material (120) does not contact and is in no way exposed to the lens (200) or hydration medium. Consequently, medical device packaging requirements should not constrain the choice of core materials (120). For example, according to one exemplary embodiment, the core material (120) may include, but is in no way limited to, glass filled polypropylene, acrylonitrile butadiene styrene, polystyrene, polyethylene terepthalate, polypropylene copolymer, polymethylpentene, polycarbonate, polysulphone, polyethylene naphthalate, cyclic olefin copolymer, fluorinated ethylene propylene, etc., to achieve desired coloring, finish, shape, etc.

The packaging (100) including both a barrier material (130) and a core material (120) can be formed, according to one exemplary embodiment, though a two-shot molding process or overmold process and allows for significant design flexibility. As mentioned previously, the overmold process described below allows for the formation of a primary contact lens package that aids a patient in locating a contact lens as well as identifying potential contamination within the package. Further details of the two-shot overmold process will be provided below.

As mentioned previously, design flexibility, in terms of materials, colors, surface finishes, and mechanical properties, may be provided to the present exemplary contact lens package by forming both a barrier material (130) portion and a core material (120) portion, according to one exemplary embodiment, through a two-shot overmold process. FIG. 11 illustrates a side cross-sectional view of a contact lens package substrate (110) formed by a two shot mold, according to one exemplary embodiment. As illustrated in FIG. 11, the substrate (110) includes both a core material (120) and a barrier material coating (130).

According to one exemplary embodiment, the core material (120) may be formed of any number of materials including non FDA approved materials. This flexibility provides for the ability to select materials based on color, texture, material properties, cost, and the like. As mentioned previously, the core material may include a masterbatch component to provide a desired color or other visual effect, such as pearlescence, opalescence, or illumination to the core material. According to this exemplary embodiment, the core material (120) may be formed by a first shot of a two-shot molding process. Subsequent to the formation of the core material (120), the barrier material coating (130) may be formed by the second shot of the two-shot molding process. As shown, the above mentioned method forms a barrier layer of the barrier material coating (130) on the core material (120). While the formation of the two-shot molded substrate (110) illustrated in FIG. 11 is described as forming the core material (120) first, followed by the forming of the barrier material coating (130), the order of operations and formation may be reversed.

According to one exemplary embodiment, the thickness of the barrier material coating (130) on the top layer of the core material (120) may be approximately, but is in no way limited to, 0.01 mm and the core material may have a thickness of approximately, but is in no way limited to, 0.70 mm. While the present substrate structure is described in the context of forming a substrate (110) for use with a top sheet member (150) and a bottom sheet member (160), the same principles and practices of using a two-shot molding method to create a core material (120) and a barrier material coating (130) may also be applied to traditional boats such as those illustrated in FIGS. 1-5, as will be described below with reference to FIG. 12.

In addition to coating the top layer of the substrate (110) using the two-shot molding method, the orifice (180) configured to house the contact lens (200) is also coated with the barrier material coating (130) to assure that the contact lens is not exposed to the core material (120) during manufacture or storage. As illustrated, the inner wall of the orifice (180) is coated with the barrier material (130) in order to assure sterility of the contact lens. As shown, a contact lens will be hermetically sealed both from the outside atmosphere and the core material (120) on each side by the barrier material (130) and on the top and bottom surfaces by the top sheet member (150) and the bottom sheet member (160), respectively.

According to one exemplary embodiment, the mold used to form the barrier material (130) on the inner wall of the orifice (180) may be configured to provide a thicker layer of barrier material, as compared to that formed on top of the core material (120), in order to assure sterility of the lens containing orifice (180). According to one exemplary embodiment, the barrier material (130) on the inner wall of the orifice (180) may vary in thickness, but is in no way limited to, a range of approximately 0.10 mm to 0.20 mm.

According to one exemplary embodiment, the core material (130) comprises a majority of the substrate (110). The barrier material (130) is in a layer above core material (120) and surrounding the center orifice (180). The barrier material on the top of the substrate (110) may also serve to bind the top sheet member (150) to the substrate (110). For example, the top sheet member (150) may be attached to the substrate (110) by a removable heat seal between in what is commonly called an easy peel seal. The barrier material (130) may be polypropylene, and polypropylene coating the top of the substrate (110) may be bound to polypropylene on the bottom of the top sheet member (150) through a removable heat seal. The top sheet member may be attached to as large an area of the top surface of the substrate (110) as desired to form a seal that will not break or compromise the sterility of the contact lens (200). FIG. 8 illustrates a seal mark (170) on the substrate (110) wider than used in edge seals in traditional packaging. The comparatively larger seal ensures a strong seal to protect sterility. According to one exemplary embodiment, the heat seal profile can also include a peak (175) toward the handle end (220) of the packaging, which helps the consumer to start a break in the seal and pull back the top sheet member (150).

Figure 12:
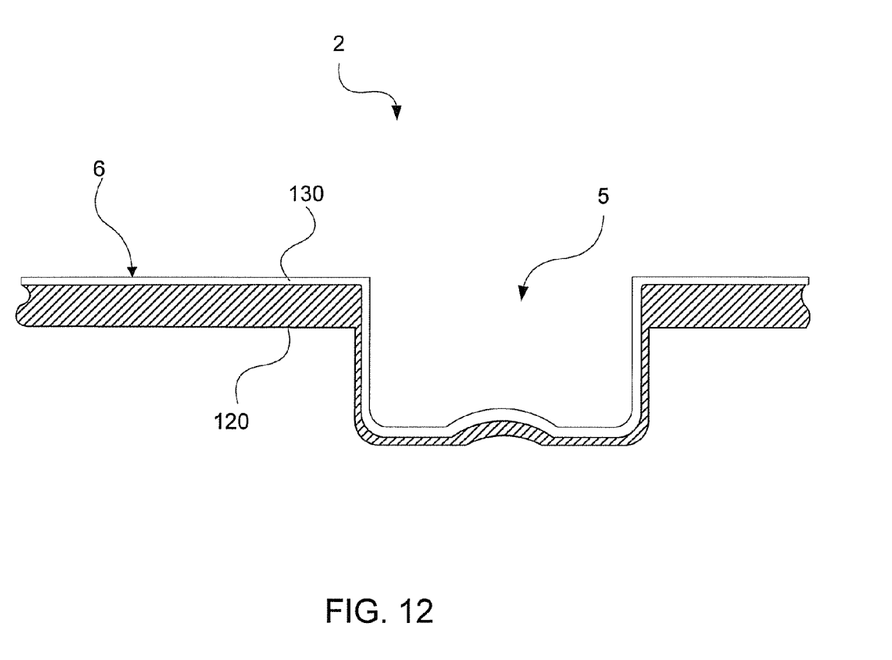
FIG. 12 is a side cross-sectional view of a boat for use in a contact lens primary package formed by a two-shot mold, according to one exemplary embodiment.

FIG. 12 illustrates a traditional blister pack member (2) formed with the previously described overmold process, according to one exemplary embodiment. The above mentioned processes and features as discussed with respect to contact lens packages having a substrate and top and bottom sheet members are equally applicable to traditional blister pack packaging. As shown in FIG. 12, a core material (120) or substrate is first molded using a colored polymer. A second, uncoloured barrier polymer is then molded on top of the core material (120) to form the barrier material coating (130). Overmolding technology is well known within the molding industry, and can be achieved with, for example, twin-barrel molders, tool turners, or by simply placing the pre-molded core material into the molding cavity of a second molder.

As mentioned previously, overmolding has the advantage in that a layer of barrier polymer will be formed between the contact lens/packing saline and the colored core material (120). The assurance that the contact lens is surrounded by a layer of barrier polymer allows for more latitude in the choice of colorants used in the colored core material. Overmolding also allows for the use of fillers within the core material such as glass fibre and other previously unavailable materials.

Exemplary Methods of Manufacturing

Figure 13:
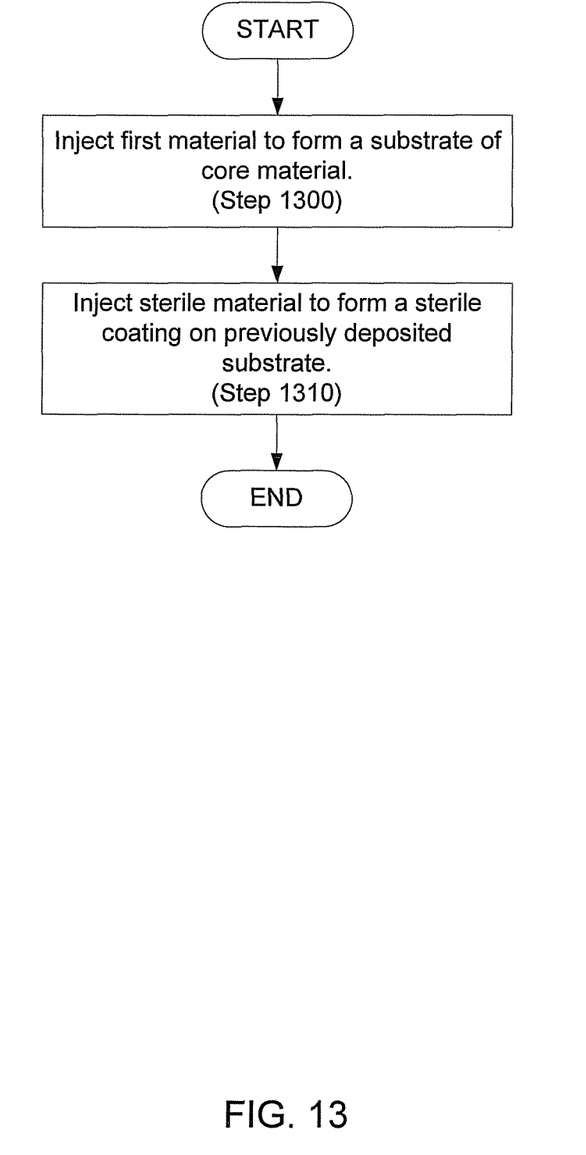
FIG. 13 is a flow chart illustrating a method for forming a contact lens packaging substrate using a two-shot mold, according to one exemplary embodiment.

In an exemplary method, the substrate (110) is manufactured to include a barrier material overlaying a core material in at least the areas that may come into physical or fluid contact with a lens stored in the substrate. The present exemplary method can be accomplished through a variety of manufacturing processes, such as the two-shot mold process. As illustrated in FIG. 13, two shot injection molding involves injecting a first core material (120) material into a single-cavity die (step 1300). According to one exemplary embodiment, the core material (120) is formed in the shape of a desired substrate with a first shot. Once the first material has started to cool, a second material is injected (step 1310). Since the materials can be kept separate throughout the process, the barrier material can be kept from contamination from the core material that would compromise the sterility of the package. Overmold, inlay, or any other known coating processes can also be used to create the two material substrate, according to various embodiments. The flexibility available to design the packaging (100), is greatly increased, as the core material (120) can be selected for any number of characteristics such as color, finish, density, strength, other mechanical properties, etc., without regard to how compatible the material is with a sterile lens environment.

While the above-mentioned overmold examples were described in the context of providing a colored core material (120) for ready identification of contaminants within a primary contact lens package, the barrier material coating (130) may also be configured to impart any number of properties to the resulting package. According to one exemplary embodiment, the barrier material coating (130) may include a hydrophilic material in the locations in contact with the lens saline. This exemplary configuration will help retain the saline around the lens upon opening the primary package.

Alternatively, the barrier material coating (130) may be a polymer such as poly(NVP). This material is known to adsorb colored species and other contaminants, and so could assist control residual species. This would reduce the likelihood of any adverse reaction of the solution contained within the primary contact lens package as a result of the presence of said residual species.

Further, the overmold process described above can, according to one exemplary embodiment, provide for the use of fillers within the PP (eg glass fibre) which will strengthen and stiffen the substrate. The overmolding approach prevents contact with the saline. Further, a deep masterbatch will improve cosmetic appearance and stiffen the substrate.

An additional advantage provided by the above-mentioned overmolding method includes the ability to produce in-mold labelling. Particularly, according to one exemplary embodiment, a holographic element(s) could be formed on the surface of the core material (120) and then covered by the barrier material coating (130). Incorporation of a holographic element would act as a counterfeit deterrent, thereby enhancing the safety of the contact lens package (100).

In conclusion, the present contact lens packaging systems and methods provide acceptable methods for producing a primary contact lens package having a colored substrate without sacrificing safety or efficacy. According to the exemplary embodiments illustrated above, the colored substrates aid a patient in identifying potential contaminants within the package, aid in the location and identification of the contact lens, may provide for secondary effects, and contamination absorption.

The preceding description has been presented only to illustrate and describe exemplary embodiments of the system and process. It is not intended to be exhaustive or to limit the system and process to any precise form disclosed. Many modifications and variations are possible in light of the above teaching. It is intended that the scope of the system and process be defined by the following claims.

What is claimed is:

1. An autoclaved primary contact lens package, comprising:
   a substrate;
   said substrate including a pre-molded core material defining a lens containing orifice and a barrier material coating, wherein said barrier material coating is molded onto said pre-molded core material;

said barrier material coating being formed of a transparent homopolymer forming a barrier layer on a surface of said core material that defines said lens containing orifice;

wherein said pre-molded core material includes a color component;

a newly manufactured contact lens disposed in said lens containing orifice; and a hydration medium sealed in said lens containing orifice with said newly manufactured contact lens.

2. The primary contact lens package of claim 1, wherein said color component is configured to enable the identification of contaminants within said primary contact lens package.

3. The primary contact lens package of claim 1, wherein said color component comprises a masterbatch component.

4. The primary contact lens package of claim 3, wherein said masterbatch component comprises between approximately 0.5 and 10.0% of said substrate.

5. The primary contact lens package of claim 3, wherein said masterbatch component comprises a colorant approved for indirect food contact.

6. The primary contact lens package of claim 3, wherein said masterbatch component comprises a colorant approved for direct food contact.

7. The primary contact lens package of claim 3, wherein said masterbatch component comprises a colorant approved for use in medical devices.

8. The primary contact lens package of claim 3, wherein said masterbatch component comprises at least one of FDA approved pigments or colorants.

9. The primary contact lens package of claim 3, wherein said masterbatch component comprises titanium dioxide.

10. The primary contact lens package of claim 1, wherein said barrier material coating ranges in thickness from approximately 0.01 mm to 0.20 mm.

11. The primary contact lens package of claim 1, wherein said barrier material coating further comprises a hydrophilic material.

12. The primary contact lens package of claim 1, wherein said barrier material coating further comprises an absorbent polymer.

13. The primary contact lens package of claim 12, wherein said barrier material coating comprises (poly)NVP.

14. The primary contact lens package of claim 1, wherein said substrate further comprises an additive configured to provide a secondary utility.

15. The primary contact lens package of claim 14, wherein said additive is configured to provide UV protection.

16. A primary contact lens package, comprising:
a substrate;
said substrate including a pre-molded core material defining a lens containing orifice and a barrier material coating, wherein said barrier material coating is molded onto said pre-molded core material;
said barrier material coating being formed of a substantially transparent homopolymer forming a barrier layer in said lens containing orifice;
wherein said pre-molded core material includes a color component; wherein said core material comprises a color component producing an in mould labeling on said primary contact lens package.

17. A method of forming an autoclaved contact lens primary package, comprising:
forming a substrate including:
providing a substrate polymer;
adding a masterbatch color component to said substrate polymer;
molding said substrate including a lens containing orifice;
molding a transparent barrier homopolymer onto a surface of said substrate that defines said lens containing orifice;
disposing a newly manufactured contact lens in said lens containing orifice; and
sealing a hydration medium in said lens containing orifice with said newly manufactured contact lens.

18. The method of claim 17, wherein said masterbatch color component comprises between approximately 0.5 and 10.0% of said substrate.

19. The method of claim 17, wherein said masterbatch color component comprises a colorant approved for indirect food contact.

20. The method of claim 17, wherein said masterbatch color component comprises a colorant approved for direct food contact.

21. The method of claim 17, wherein said masterbatch color component comprises a colorant approved for use in medical devices.

22. The method of claim 17, wherein said masterbatch color component comprises FDA approved pigments and colorants.

23. The method of claim 17, wherein said masterbatch color component comprises titanium dioxide.

* * * * *